United States Patent
Yamada et al.

(10) Patent No.: US 7,025,912 B2
(45) Date of Patent: Apr. 11, 2006

(54) MICROCAPSULE AND MANUFACTURING METHOD THEREOF

(75) Inventors: Satoru Yamada, Shizuoka-ken (JP); Yuuichi Fukushige, Shizuoka-ken (JP); Kyoko Senga, Shizuoka-ken (JP); Naoto Yanagihara, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 10/830,448

(22) Filed: Apr. 23, 2004

(65) Prior Publication Data

US 2004/0265589 A1    Dec. 30, 2004

(30) Foreign Application Priority Data

Apr. 25, 2003 (JP) .............................. 2003-121601
Apr. 25, 2003 (JP) .............................. 2003-121602
Mar. 17, 2004 (JP) .............................. 2004-076801

(51) Int. Cl.
  *B01J 13/02*    (2006.01)
(52) U.S. Cl. .................. 264/4.33; 264/4.1; 264/4.3; 264/4.32; 428/402.22; 428/402.24; 428/403; 428/407
(58) Field of Classification Search ............. 264/4.1, 264/4.3, 4.32, 4.33; 428/402.22, 402.24, 428/403, 407
See application file for complete search history.

(56) References Cited

U.S. PATENT DOCUMENTS

| | | | |
|---|---|---|---|
| 2,800,457 A | 7/1957 | Green et al. | |
| 3,111,407 A | 11/1963 | Lindquist et al. | |
| 3,287,154 A | 11/1966 | Haas | |
| 3,418,250 A | 12/1968 | Vassiliades | |
| 3,796,669 A | 3/1974 | Kiritani et al. | |
| 3,914,511 A | 10/1975 | Vassiliades | |
| 4,001,140 A | 1/1977 | Foris et al. | |
| 4,025,455 A | 5/1977 | Shackle | |
| 6,656,880 B1 * | 12/2003 | Aono | 503/207 |

FOREIGN PATENT DOCUMENTS

| | | |
|---|---|---|
| GB | 952807 | 5/1962 |
| GB | 990443 | 5/1963 |
| JP | 36-9168 B | 6/1961 |
| JP | 38-19574 B | 9/1963 |
| JP | 05-7767 A | 1/1993 |
| JP | 06-339624 A | 12/1994 |

* cited by examiner

*Primary Examiner*—Samuel A. Acquah
(74) *Attorney, Agent, or Firm*—Sughrue Mion, PLLC

(57) ABSTRACT

A microcapsule in which a capsule wall of the microcapsule comprises a first polymer component. A surface of the capsule wall is modified with a second polymer component that is formed from a monomer having an ethylenic unsaturated bond.

13 Claims, No Drawings

MICROCAPSULE AND MANUFACTURING METHOD THEREOF

CROSS-REFERENCE TO RELATED APPLICATION

This application claims priority under 35 USC 119 from Japanese Patent Application Nos. 2003-121601, 2003-121602 and 2004-76801, the disclosures of which are incorporated by reference herein.

BACKGROUND OF THE INVENTION

1. Field of the Invention

The present invention relates to a microcapsule that is used in recording materials such as heat-sensitive recording materials and pressure-sensitive recording materials, and, more particularly, to a microcapsule that makes it possible to freely design the characteristics of a capsule such as storage stability, light resistance or humidity dependence and can be manufactured according to a simple and easy manufacturing method.

2. Description of the Related Art

As methods of forming microcapsules, there are various conventionally known methods such as a method that makes use of coacervation of a hydrophilic wall forming material (see, for example, U.S. Pat. No. 2,800,457); an interfacial polymerization method (see, for example, U.S. Pat. No. 3,287,154, U.K. Patent No. 990443, and Japanese Patent Application Publication (JP-B) No. 38-19574); a method using polymer precipitation (see, for example, U.S. Pat. No. 3,418,250); a method that uses an isocyanate polyol wall material (see, for example, U.S. Pat. No. 3,796,669); a method that uses an isocyanate wall material (see, for example, U.S. Pat. No. 3,914,511); a method that uses urea-formaldehyde-based and urea formaldehyde-resorcinol-based wall forming materials (see, for example, U.S. Pat. No. 4,001,140); a method that uses wall forming materials such as melamine-formaldehyde resins, hydroxypropyl cellulose and so on (see, for example, U.S. Pat. No. 4,025,455); an in situ method due to monomer polymerization (see, for example, JP-B No. 36-9168); an electrolytic dispersion cooling method (see, for example, U.K. Patent No. 952807); and a spray drying method (see, for example, U.S. Pat. No. 3,111,407).

Specifically, in the interfacial polymerization method, an oil phase in which a core-forming material is dissolved or dispersed in a hydrophobic organic solvent is mixed with a aqueous phase that contains a water-soluble polymer followed by emulsifying and dispersing using a homogenizer and further followed by heating, whereby a polymer forming reaction is caused at an oil/water interface. As a result, a microcapsule wall made of a polymer is formed and encapsulation is attained. In view of the advantages that the method can provide microcapsules excellent in storage stability and having a uniform particle diameter in a short time, the interfacial polymerization method is in wide use.

On the other hand, in the manufacture of microcapsules, it is necessary to control the characteristics of a capsule in accordance with the field in which it is used.

As a technology that can improve the resistance of microcapsule against moisture and humidity, see, for example, Japanese Patent Application Laid-Open (JP-A) No. 5-7767 proposes a double-wall microcapsule including a primary wall made of an amino resin and a secondary wall made of a poly-ion complex of a cationic polyamide-epihalohydrin resin and polystyrene sulfonic acid. However, there has been a problem in that the range of selection of desired characteristics is quite limited. Accordingly, a microcapsule manufacturing method that can simply and easily control various characteristics has been required.

Furthermore, JP-A No. 6-339624 proposes a heat-resistant microcapsule in which a wall film is made of a particular melamine resin and a heat resistant layer made of heat resistant particles and silicone oil is coated on a surface of the wall film. However, in the method of generating such heat-resistant microcapsules, there is a problem in that adjustment under a particular environment is necessary. Accordingly, there is a demand for development of a more versatile method.

Furthermore, in a case where coating is applied to the microcapsule as mentioned above, it is also important to improve a covering state thereof.

SUMMARY OF THE INVENTION

The present invention is achieved in view of the above-described situations. The invention provides a microcapsule that makes it possible to freely design the characteristics of a capsule (storage stability, light resistance, thermal sensitivity, color development and humidity dependence) and can be manufactured according to a simple and easy manufacturing method; and a manufacturing method thereof.

A first aspect of the present invention is to provide a microcapsule in which a capsule wall of the microcapsule includes a first polymer component, and a surface of the capsule wall is modified with a second polymer component that is formed from a monomer having an ethylenic unsaturated bond.

A second aspect of the present invention is to provide a method of manufacturing a microcapsule, including: forming a capsule wall with a first polymer component in a liquid composition; and modifying a surface of the capsule wall with a second polymer component by adding a monomer having an ethylenic unsaturated bond to the liquid composition obtained in the forming of the capsule wall, to thereby polymerize the monomer.

A third aspect of the present invention is to provide a method of manufacturing a microcapsule, including: forming a capsule wall with a third polymer component that is formed by using isocyanate in a liquid composition; and modifying a surface of the capsule wall with a fourth polymer component including polymer particles including a polymer that is formed without using isocyanate by adding the polymer particles to the liquid composition obtained in the forming of the capsule wall.

According to the invention, a microcapsule that makes it possible freely design the characteristics of a capsule (storage stability, light resistance, thermal sensitivity, color development and humidity dependence) and can be manufactured according to a simple and easy manufacturing method; and a manufacturing method thereof.

DETAILED DESCRIPTION OF THE INVENTION

First Embodiment

Microcapsule

A microcapsule according to a first embodiment of the present invention has a capsule wall including a first polymer component, and a surface of the capsule wall is modified with a second polymer component that is formed from a monomer having an ethylenic unsaturated bond (hereinafter, sometimes referred to as "monomer of the invention").

In the microcapsule according to the first embodiment of the invention, since the surface of the capsule wall including the first polymer component is modified with the second polymer component, when the kind and the amount of the first and second polymer components are appropriately selected, the capsule characteristics such as heat resistance, light resistance, thermal sensitivity, color development, or humidity dependence can be simply and easily controlled. Accordingly, the microcapsule can be provided with desired characteristics in conformity to various field in which it is used (heat-sensitive recording materials, pressure-sensitive recording materials and so on).

Furthermore, in the invention, the second polymer component is formed from a monomer of the invention, and therefore a surface of the capsule wall can be simply and easily modified with the second polymer component. Accordingly, the microcapsule according to the first embodiment of the invention can be simply and easily manufactured by partly using a conventional manufacturing method of microcapsule.

Here, "a surface of the capsule wall is modified with a second polymer component that is formed from a monomer having an ethylenic unsaturated bond" means a state where the second polymer component is adhered to a surface of a capsule wall including the first polymer component. The second polymer component does not necessarily adhere to the entire surface of the capsule wall. However, the second polymer component preferably adheres to substantially the entire surface of the capsule wall in a range that does not damage the characteristics (for instance, transmittivity and so on) intrinsic to the microcapsule, and, more preferably, the second polymer component covers the entire surface of the capsule wall.

In the microcapsule according to the first embodiment of the invention, the ratio of an adhered area (covering area) of the second polymer component to a surface area of the capsule wall, in view of sufficiently exhibiting effects of the invention, is preferably 70% or more, and more preferably 80% or more.

Furthermore, an adhered amount of the second polymer component to the microcapsule according to the first embodiment of the invention may be appropriately selected according to objects for which the invention is used. In view of sufficiently exhibiting effects of the invention, the adhered amount is preferably in the range of 1 to 50% by mass, and more preferably in the range of 5 to 30% by mass based on a mass of the microcapsule.

The microcapsule according to the first embodiment of the invention, without particular limitation, can be appropriately used in fields where the microcapsule can be used. For instance, the microcapsules can be preferably used as a microcapsule containing a color forming component and so on in heat-sensitive recording materials and pressure-sensitive recording materials. Furthermore, the application of the microcapsule according to the first embodiment of the invention is not limited to the heat-sensitive recording materials and the pressure-sensitive recording materials, and the microcapsule may be used as lubricants and the like.

In the invention, it is unnecessary to distinguish the microcapsule according to the first embodiment of the invention and a microcapsule according to a second embodiment of the invention described later in an overlapping realm thereof, and they can be regarded as equivalents.

Manufacturing Method of Microcapsule

A manufacturing method of a microcapsule according to the first embodiment of the invention includes forming a capsule wall with a first polymer component in a liquid composition; and modifying a surface of the capsule wall with a second polymer component by adding a monomer having an ethylenic unsaturated bond (monomer of the invention) to the liquid composition obtained in the forming of the capsule wall, to thereby polymerize the monomer. According to the manufacturing method of a microcapsule according to the first embodiment of the invention (hereinafter, sometimes referred to as "the manufacturing method according to the first embodiment"), the microcapsule according to the first embodiment can be simply and easily manufactured. Here, "modifying a surface of the capsule wall with a second polymer component" means modifying a surface of the capsule wall with the second polymer component that is formed from a monomer having an ethylenic unsaturated bond; and "modifying" means to adhere the second polymer component on a surface of the capsule wall including the first polymer component, similarly to the above.

Forming Capsule Wall

The capsule wall forming step is a step of forming a capsule wall with a first polymer component in a liquid composition. In the invention, the formation of the capsule wall may employ conventional microcapsulating methods. The method may be appropriately selected from those described in U.S. Pat. Nos. 2,800,457 and 2,800,458 and makes use of coacervation of hydrophilic wall forming materials; an interfacial polymerization method described in U.S. Pat. No. 3,287,154, U.K. Patent No. 990443, and JP-B Nos. 38-19574, 42-446 and 42-771; a method due to polymer precipitation described in U.S. Pat. Nos. 3,418,250 and 3,660,304; a method that is described in U.S. Pat. No. 3,796,669 and uses an isocyanate polyol wall material; a method that is described in U.S. Pat. No. 3,914,511 and uses an isocyanate wall material; a method that is described in U.S. Pat. Nos. 4,001,140, 4,087,376 and 4,089,802 and uses wall forming materials such as urea-formaldehyde and urea formaldehyde-resorcinol; a method that is described in U.S. Pat. No. 4,025,455 and uses wall forming materials such as melamine-formaldehyde resins, hydroxypropyl cellulose and so on; an in situ method due to monomer polymerization described in JP-B No. 36-9168 and JP-A No. 51-9079; an electrolytic dispersion cooling method described in U.K. Patent Nos. 952807 and 965074; a spray drying method described in U.S. Pat. No. 3,111,407 and U.K. Patent No. 930422; and methods described in JP-B No. 7-73069 and JP-A Nos. 4-101885 and 9-263057.

The liquid composition includes a compound that forms the first polymer component, which becomes a capsule wall. Further, materials such as a dye precursor, an organic solvent, an auxiliary solvent, a surfactant and the like that are to be encapsulated may be dissolved and included in the liquid composition. These materials to be encapsulated may also be dispersed in water and included in the liquid composition.

In the invention, the capsule wall forming methods (microcapsulating method) are not limited to the above; however, the interfacial polymerization method can be preferably adopted. In the interfacial polymerization method, an oil phase prepared by dissolving or dispersing a core material (for instance, color forming component) that becomes a core of the capsule in a hydrophobic organic solvent is mixed with a aqueous phase in which a water-soluble polymer is dissolved followed by emulsifying and dispersing by means of such as a homogenizer and so on further followed by heating, thereby a polymer forming reaction is caused at an oil/water interface, whereby a microcapsule wall made of a polymer (the first polymer component) is formed. In the interfacial polymerization method, capsules having uniform particle diameters can be formed in a short time period, and when the invention is applied to recording materials, excellent unprocessed stock storability can be obtained. A method of forming a capsule wall (microcapsulating method) will be explained below with reference to the interfacial polymerization method as an example.

Examples of a microcapsule that can be preferably used in the heat-sensitive recording materials and so on include those in which, at normal temperatures, substances inside and outside of a capsule are inhibited from contacting with each other due to a segregation function of the capsule wall, and only when heat and/or pressure is applied to a certain value or more, the substances inside and outside of the capsule are allowed coming into contact. The phenomena can be freely controlled as the variation of the physical properties of the capsule, when the material of the capsule wall, capsule core material (substance contained in the capsule) and additives are appropriately selected.

Examples of the first polymer component that becomes a capsule wall material in the invention include polyurethane, polyurea, polyamide, polyester, polycarbonate, urea-formaldehyde resin, melamine resin, polystyrene, styrene-methacrylate copolymer and styrene-acrylate copolymer. Among these, polyurethane, polyurea, polyamide, polyester and polycarbonate are preferable, and polyurethane and polyurea are preferable. The first polymer component may include two or more kinds of materials in combination.

According to the interfacial polymerization method, the microcapsule according to the first embodiment of the invention is formed by pouring an oil phase that is prepared by dissolving or dispersing a core substance in a hydrophobic organic solvent in a aqueous phase followed by emulsifying and dispersing and further followed by heating. As the aqueous phase in which the oil phase is emulsified and dispersed, an aqueous solution in which a water-soluble polymer is dissolved may be used. Examples of the water-soluble polymer contained in the aqueous phase include gelatin, polyvinyl pyrrolidone and polyvinyl alcohol. The detail will be described later.

The first polymer component that becomes a capsule wall material in the invention is preferably formed by using isocyanate. For instance, in the case polyurethane is used as the capsule wall material, polyvalent isocyanate and a second substance (for instance, polyol, polyamine) that reacts with polyvalent isocyanate to form a capsule wall are blended in an aqueous solution of a water-soluble polymer (aqueous phase) or an oily medium (oil phase) to be capsulated, followed by emulsifying and dispersing in water, further followed by heating, thereby a polymer forming reaction occurs at an oil drop interface, whereby a capsule wall can be formed.

Examples of the polyvalent isocyanate and partner polyol and polyamine that react therewith include those described in U.S. Pat. Nos. 3,281,383, 3,773,695 and 3,793,268, JP-B Nos. 48-40347 and 49-24159 and JP-A Nos. 48-80191 and 48-84086.

In the invention, when a microcapsule containing a color forming component is formed, a contained color forming component may be present in a solution state or a solid state in the capsule.

When a color forming component is to be contained in a solution state in the capsule in the case of manufacturing a heat-sensitive recording material, a color forming component such as an electron-donating colorless dye or a diazonium chloride compound may be encapsulated in a state dissolved in an organic solvent.

In general, the above solvent can be appropriately selected from high boiling point solvents such as phosphoric acid esters, phthalic acid esters, acrylates, methacrylates, esters of other carboxylic acids, aliphatic acid amides, alkylated biphenyls, alkylated terphenyls, chlorinated paraffins, alkylated naphthalenes, diallyl ethane, solid compounds at normal temperatures, oligomer oils and polymer oils.

Specific examples of organic solvents include those described in JP-A Nos. 59-178451, 59-178452, 59-178453, 59-178454, 59-178455, 59-178457, 60-242094 63-85633, 6-194825, 7-13310 and 7-13311, 9-106039 and 63-45084.

Furthermore, in encapsulating, so-called oil-less capsule may be formed without using the above organic solvents.

An amount of the organic solvent used is preferably in the range of 1 to 500 parts by mass based on 100 parts by mass of the color forming component.

Furthermore, in case the solubility of the color forming component to be encapsulated is low with respect to the organic solvent, a low-boiling-point solvent having a good dissolving effect may be further added as an auxiliary solvent.

The low-boiling-point solvent may be used instead of using the above-described organic solvent.

Examples of the low-boiling-point solvent include ethyl acetate, propyl acetate, isopropyl acetate, butyl acetate and methylene chloride.

The oil phase is poured in the aqueous phase followed by being emulsified and dispersed by means of a homogenizer or the like. The water-soluble polymer that is added to the aqueous phase has a function as a protective colloid that enables to disperse uniformly and easily and at the same time works also as a dispersing agent that stabilizes an emulsified and dispersed aqueous solution. The water-soluble polymer that is contained as the protective colloid can be appropriately selected from known anionic polymers, nonionic polymers and amphoteric polymers.

The anionic polymers may be natural polymers or synthesized polymers, and examples thereof include polymers having a linkage group such as —COO— and —SO$_2$—.

Specific examples thereof include natural products such as gum Arabic, alginic acid and pectin; semi-synthetic products such as carboxylmethyl celluloses, gelatin derivatives such as phthalated gelatins, sulfated starch, sulfated cellulose and lignin sulfonic acid; and synthetic products such as maleic anhydride base copolymers (including hydrolysis products), acrylic acid base (methacrylic acid base) polymers and copolymers, vinylbenzenesulfonic acid base polymers and copolymers and carboxy-modified polyvinyl alcohols.

Examples of the nonionic polymers include polyvinyl alcohols, hydroxyethyl celluloses and methyl celluloses.

Examples of the amphoteric polymers include gelatins and gelatin derivatives.

Among these, gelatins, gelatin derivatives and polyvinyl alcohols are preferable.

The water-soluble polymer may be used as an aqueous solution of 0.01 to 10% by mass.

Furthermore, in order to more uniformly emulsify and disperse and to obtain a more stable dispersion solution, a surfactant may be added to at least one of the oil phase or the aqueous phase.

The surfactant can be appropriately selected from known emulsifying surfactants. For instance, from among the anionic or nonionic surfactants, ones that work as the protective colloid and neither precipitate nor coagulate can be appropriately selected and used.

Specific examples thereof include sodium alkyl benzene sulfonates, sodium alkyl sulfates, dioctyl esters of sodium sulfosuccinic acid, and polyalkylene glycols (for instance, polyoxyethylene nonylphenyl ether).

An amount of the surfactant to be added is preferably in the range of 0.1 to 5%, and more preferably in the range of 0.5 to 2% based on a mass of the oil phase.

After the emulsifying and dispersing, in order to accelerate a capsule wall formation reaction, an emulsified product is heated to a temperature of 30 to 70° C., whereby the capsule wall including the first polymer component can be formed in the liquid composition. Furthermore, in order to inhibit capsules from aggregating each other during the reaction, it is necessary to add water so as to lower the collision probability between capsules or to agitate sufficiently.

Furthermore, during the reaction, an aggregation-preventive dispersant may be added.

An end point of the capsule wall formation reaction can be judged by observing a termination of $CO_2$ gas generation, which is observed during the polymerization reaction.

Ordinarily, when the reaction is carried out for several hours, a microcapsule containing the color forming component can be obtained.

When the invention is applied to the heat-sensitive recording materials or the like, an average particle diameter of the microcapsules before being modified with the second polymer component is preferably 20 μm or less and, from a viewpoint of obtaining higher resolution, more preferably 5 μm or less.

Furthermore, when an average particle diameter of formed microcapsules is too small, a surface area for a definite amount of solid content becomes larger, resulting in necessitating much wall material; accordingly, the above average particle diameter is preferably 0.1 μm or more.

Modification

In the modification step, in the liquid composition where the capsule wall is formed (microcapsulated), the monomer of the invention is added to further polymerize, whereby a surface of the capsule wall can be modified with the second polymer component.

The second polymer may be the same kind as the first polymer or may be different kind therefrom. From the viewpoint of controlling of the capsule characteristics, the different kind of polymers may be preferably used, and the polymers different in the glass transition temperature may be more preferably used. The difference between the glass transition temperatures of the two kinds of polymers is preferably 5° C. or more and more preferably 10° C. or more.

In the invention, the second polymer component is formed from a monomer (monomer of the invention) that has an ethylenic unsaturated bond. As the monomer of the invention, any monomer having an ethylenic unsaturated bond, within a range that does not damage the effects of the invention, can be appropriately selected and used.

Specific examples of the monomer of the invention include acrylic acid and salts thereof, acrylates, and acrylamides; methacrylic acid and salts thereof, methacrylates, and methacrylamides; maleic acid anhydride and maleates; itaconic acid and itaconic acid esters; styrenes; vinylethers; vinylesters; N-vinyl heterocycles; arylethers; and allylesters.

Among these, ones having plural vinyl groups in a molecule can be particularly preferably used. Examples of such monomers include acrylates and methacrylates of polyhydric alcohols such as trimethylolpropane and pentaerythritol; acrylates and methacrylates of polyvalent phenols and bisphenols such as resorcinol, pyrogallol and fluoroglucinol; and epoxy resins with acrylate or methacrylate terminal, polyesters with acrylate or methacrylate terminal.

Among these, ethylene glycol diacrylate, ethylene glycol dimethacrylate, trimethylolpropane triacrylate, pentaerythritol tetraacrylate, dipentaerythritol hydroxypentaacrylate, hexanediol-1, 6-dimethacrylate and diethylene glycol dimethacrylate are particularly preferable.

Furthermore, from a viewpoint of improving the coverage of the capsule wall with the second polymer component, the glass transition temperature (Tg) of the monomer of the invention is preferably 80° C. or less and more preferably 60° C. or less. Thus, a covering state of the microcapsule can be made a preferable one, without applying the heat treatment, by using a monomer that becomes a polymer having a Tg lower than the polymerization reaction temperature in advance.

A molecular weight of the monomer of the invention, without particular limitation, may be selected in accordance with the desired object. The molecular weight is preferably in a range of about 100 to 5000, and more preferably in a range of about 300 to 2000.

In a manufacturing method according to the first embodiment of the invention, in the liquid composition where the capsule wall is formed (microcapsulated), a monomer of the invention is added and polymerized, and thereby the second polymer component formed from the monomer of the invention can be adhered to the surface of the capsule wall (the second polymer component can modify the surface of the capsule wall). A polymerization method of the monomer of the invention can be appropriately selected from known polymerization methods; among these, radical polymerization (emulsion polymerization that is used to manufacture latex) is preferable.

A reaction temperature in the polymerization reaction of the monomer of the invention is, though depending on the kind of monomer of the invention and the kind of the capsule wall material (first polymer component), usually preferably in the range of about 40 to 100° C. and more preferably in the range of about 50 to 80° C. Furthermore, the reaction time is, though depending on the kind of monomer of the invention, preferably in the range of about 5 to 15 hours and more preferably in the range of about 5 to 10 hours.

Furthermore, an amount of the monomer of the invention to be added, from a viewpoint of fully exhibiting the object of the invention, is preferably in the range of 1 to 50% by mass and more preferably in the range of 5 to 30% by mass based on a mass of the microcapsule.

In the invention, in order to improve the reaction efficiency when the monomer is polymerized, a polymerization initiator or a surfactant may be added to the liquid composition. The liquid composition may include both a polymerization initiator and a surfactant.

As the polymerization initiators, any of photo-polymerization initiators and thermal polymerization initiators can be used. Specific examples thereof will be explained below.

Examples of the photo-polymerization initiators include aromatic ketones such as benzophenone, 4,4-bis(dimethylamino)benzophenone, 4-methoxy-4'-dimethylamino benzophenone, 4,4'-dimethoxybenzophenone, 4-dimethylamino benzophenone, 4-dimethylaminoacetophenone, benzyl anthraquinone, 2-tert-butylanthraquinone, 2-methylanthraquinone, xanthone, thioxanthone, 2-chlolothioxanthone, 2,4-diethylthioxanthone, fuluorenone, acridone, bisacylphosphine oxides such as bis(2,4,6-trimethylbenzoyl)-phenylphosphine oxide and so on, acylphosphine oxides such as 2,4,6-trimethylbenzoyl-diphenylphosphine oxide; benzoin and benzoin ethers such as benzoin methyl ether, benzoin ethyl ether, benzoin isopropyl ether and benzoin phenyl ether; 2,4,6-triaryl imidazole dimmers such as 2-(o-chlorophenyl)-4,5-diphenyl imidazole dimer, 2-(o-chlorophenyl)-4,5-di(m-methoxyphenyl) imidazole dimer, 2-(o-fluorophenyl)-4,5-diphenyl imidazole dimer, 2-(o-methoxyphenyl)-4,5-diphenyl imidazole dimer and 2-(p-methoxyphenyl)-4,5-diphenyl imidazole dimer; poly halogen compounds such as carbon tetrabromide, phenyl tribromomethyl sulfone and phenyl trichloromethyl ketone; compounds described in JP-A No. 59-133428, JP-B Nos. 57-1819 and 57-6096 and U.S. Pat. No. 3,615,455; S-triazine derivatives with a trihalogen substituted methyl group described in JP-A No. 58-29803 such as 2,4,6-tris(trichloromethyl)-S-triazine, 2-methoxy-4,6-bis(trichloromethyl)-S-triazine, 2-amino-4,6-bis(trichloromethyl)-S-triazine, and 2-(p-methoxystyryl)-4,6-bis(trichloromethyl)-S-triazine; organic peroxides described in JP-A No. 59-189340 such as methyl ethyl ketone peroxide, cyclohexanone peroxide, 3,3,5-trimethylcyclohexanone peroxide, benzoyl peroxide, ditertially butyldiperoxy isophthalate, 2,5-dimethyl-2,5-di (benzoylperoxy)hexane, tertially butylperoxy benzoate, a, a'-bis(tertially butylperoxyisopropyl)benzene, dicumyl peroxide, and 3,3', 4,4'-tetra-(tertially butylperoxy carbonyl) benzophenone; azinium salt compounds described in U.S. Pat. No. 4,743,530; organic boron compounds described in EP No. 0223587 such as tetramethyl ammonium salt of triphenyl butyl borate, tetrabutyl ammonium salt of triphenylbutyl borate, and tetramethyl ammonium salt of tri(p-methoxyphenyl)butyl borate; and other diaryliodonium salts and iron allene complexes.

Furthermore, photo-polymerization initiators in which two or more kinds of compounds are combined are known, and these can also be used in the invention.

Examples of combination of two or more kinds include a combination of 2,4,5-triarylimidazole dimer and mercapto benzoxazole and so on; a combination of 4,4'-bis(dimethylamino)benzophenone and benzophenone or benzoin methyl ether described in U.S. Pat. No. 3,427,161; a combination of benzoyl-N-methylnaphtothiazoline and 2,4-bis(trichloromethyl)-6-(4'-methoxyphenyl)-triazole described in U.S. Pat. No. 4,239,850; a combination of dialkylaminobenzoate ester and dimethylthioxantone described in JP-A No. 57-23602; and a combination of three kinds of 4,4'-bis(dimethylamino) benzophenone and benzophenone and polyhalogenated methyl compound described in JP-A No. 59-78339.

Examples of other photo-polymerization initiators include organic borate compounds or spectral sensitizing dye base borate compounds obtained from cationic dyes described in JP-A Nos. 62-143044, 9-188685, 9-188686 and 9-188710.

Preferable examples of the thermal polymerization initiators include 2,2'-azobis-4-methoxy-2,4-dimethylvaleronitrile (AIVN), 2,2'-azobis-2-amidinopropane dihydrochloride, 1,1'-azobiscyclohexane-1-carbonitrile, 2,2'-azobis-2,4-dimethylvaleronitrile and 2,2'-azobis-2-methylpropanenitrile (AIBN); however, the invention is not limited thereto.

An amount of the polymerization initiators to be added is preferably in the range of 0.001 to 0.1 parts by mass and more preferably in the range of 0.01 to 0.05 parts by mass based on one part by mass of the monomer of the invention. Furthermore, when a polymerizable surfactant to be described later is used as a surfactant, it is preferable to use a water-soluble polymerization initiator having an opposite charge to the polymerizable surfactant.

Specific examples of the thermal polymerization initiators include the following.

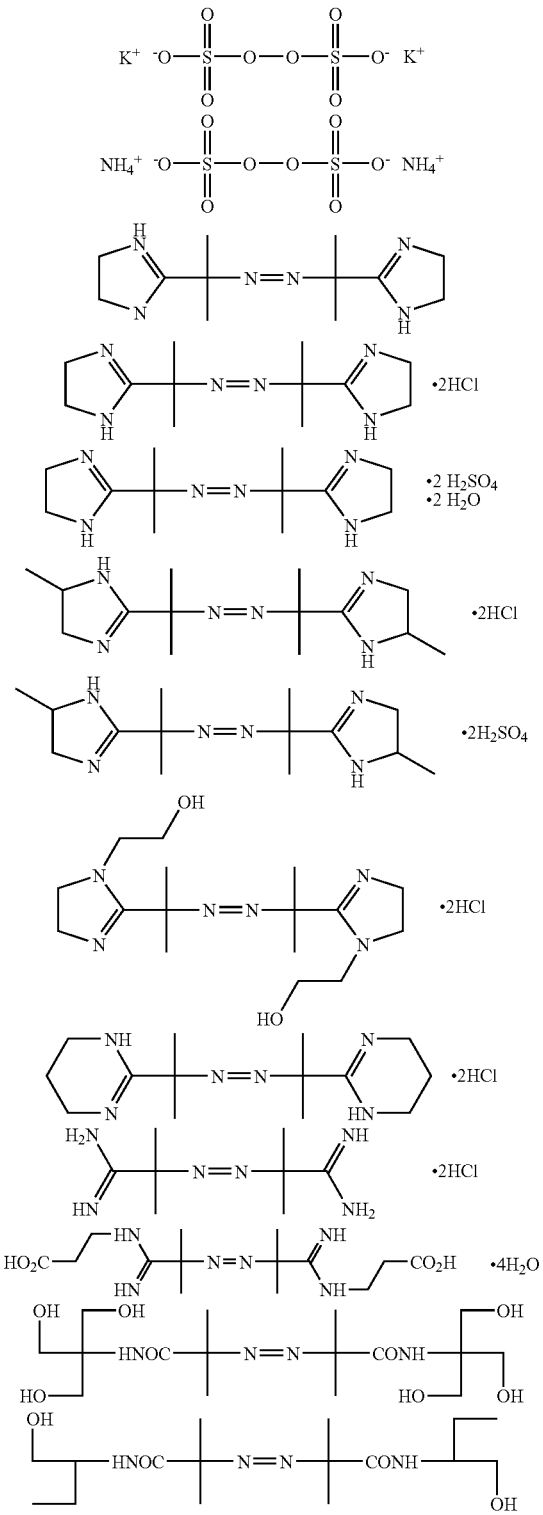

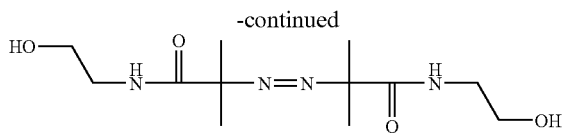

As the above surfactants, polymerizable surfactants containing a polymerizable group can be particularly preferably used. When the polymerizable surfactant is used, the surfactant tends to be present much in the neighborhood of a surface of the capsule wall. Accordingly, when a polymerization initiator having a charge opposite to the polymerizable surfactant is selected, it becomes possible to effectively modify the surface of the capsule wall with the second polymer component.

Examples of the polymerizable group of the polymerizable surfactant include a group having a radical polymerizable double bond. Examples of such a group having a double bond include a vinyl group or a (meth)acryloyl group. Furthermore, examples of hydrophilic functional groups of the polymerizable surfactant include anionic groups such as a sulfate group, a nitrate group, a phosphate group, a borate group and a carboxyl group; cationic groups such as an amino group; polyoxyalkylene chain structures such as polyoxyethylene, polyoxymethylene and polyoxypropylene; or a hydroxy group. Examples of hydrophobic groups include an alkyl group and a phenyl group. The polymerizable surfactant can be rendered anionic, nonionic, cationic, or amphoteric depending on the kind of the hydrophilic functional group. Still furthermore, as to the radical polymerizable double bond, the hydrophilic functional group and hydrophobic group in a molecular structure of the polymerizable surfactant, plural kinds of structures and functional groups may be contained. Specific examples of the polymerizable surfactant include the following.

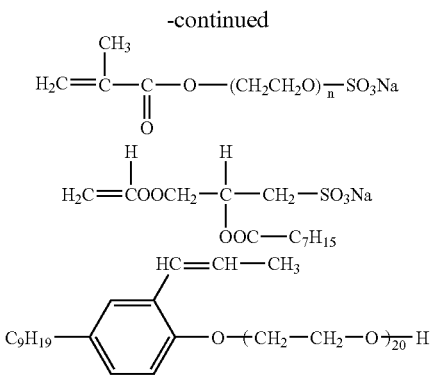

Furthermore, examples of the polymerizable surfactant include the following. As an anionic surfactant, commercially available products such as Adeka Reasoap SE (manufactured by Asahi Denka Kogyo K.K), Aqualon HS, BC, KH (manufactured by Dai-ichi Kogyo Seiyaku Co., Ltd.), Antox MS (manufactured by Nippon Nyukazai Co., Ltd.), Adeka Reasoap SDX and PP (manufactured by Asahi Denka Kogyo K.K), LATEMUL S (manufactured by Kao Corporation), Hitenol A (Dai-ichi Kogyo Seiyaku Co., Ltd.), Eleminol RS (manufactured by Sanyo Chemical Industries, Ltd.) and Spinomar (manufactured by Toyo Soda Manufacturing Co., Ltd.) can be preferably used. As a nonionic surfactants, commercially available products such as Aqualon RN, Noigen N (manufactured by Dai-ichi Kogyo Seiyaku Co., Ltd.) and Adeka Reasoap NE (manufactured by Asahi Denka Kogyo K.K) can be preferably used. These may be used in single or in combination of two or more kinds.

A content of the surfactant is preferably in the range of 1 to 30 parts by mass and more preferably in the range of 1 to 20 parts by mass based on one part by mass of the monomer of the invention.

Furthermore, as to timing when the monomer of the invention is added to the liquid composition in the modification step, there is no particular limitation as far as it is added after the formation of the capsule wall in the capsule wall formation step. For instance, the monomer may be successively added after the formation of the capsule wall (after emulsifying polymerization). Furthermore, the second polymer component may be one kind or two kinds or more; it can be appropriately determined according to desired characteristics. Still furthermore, as needs arise, in the middle of the polymerization reaction of the monomer of the invention, another monomer of the invention that is different from the monomer of the invention may be further added to modify the capsule wall with two different kinds of second polymers in a hetero type.

Surface Smoothing

In the invention, it is preferable, after the modification step, to apply a smoothing treatment on a surface of the capsule wall that has been modified by the second polymer component so as to further improve the modification effect by increasing the coverage of the capsule wall with the second polymer component. Examples of the smoothing treatment include applying a heat treatment to the microcapsules, a plasticizer treatment, and so on. In particular, the heat treatment may be preferably applied. When the heat treatment is applied after the step of modification, the coverage of the capsule wall with the second polymer component can be improved and a covering state with the second polymer component can be improved.

Examples of the plasticizer that can be used in the plasticizer treatment include ester compounds such as phthalic ester compounds, aliphatic ester compounds and phosphoric ester compounds. The plasticizer is preferably in a liquid state at normal temperature. Furthermore, there are no particular limitations on the temperature and time period of the plasticizer treatment as far as they are within a range in which the capsule dispersion can withstand. An amount of the plasticizer to be added is preferably 50% by mass or less and more preferably 20% by mass or less based on the second polymer component. As a lower limit of the amount to be added, 2% by mass or more is preferable.

Specifically, in the plasticizer treatment, after the monomer of the invention is added to a capsule dispersion, the above-described plasticizer is added to the capsule dispersion followed by being stirred. An amount of the plasticizer to be added is preferably 100% by mass or less based on the monomer. When the plasticizer is added to a capsule dispersion solution, in the capsule dispersion, a polymer component adsorbed on the capsule wall absorbs highly hydrophobic plasticizer and swells, resulting in softening. Accordingly, only by stirring the capsule dispersion solution, the shape of the polymer component adsorbed on the capsule wall is deformed due to collisions between individual particles and the like. As a result, the unevenness of the surface of the polymer component that covers the microcapsule can be reduced, that is, the surface of the microcapsule can be smoothed.

In the heat treatment, a temperature of the heat treatment can be set with reference to the glass transition temperature or the like of the second polymer component. For instance, a temperature of the heat treatment is preferably higher than the glass transition temperature of the second polymer component, more preferably higher by 10 to 40° C., and still more preferably higher by 20 to 30° C. The monomer of the invention is normally polymerized in the range of 60 to 70° C.; accordingly, a temperature of the heat treatment is preferably 80° C. or more and more preferably 85° C. or more. In particular, in the case of the glass transition temperature of the second polymer component being 80° C. or more, the temperature is preferably set at the glass transition temperature of the second polymer component or more.

A time period of the heat treatment, though not being particularly limited, is normally preferably about 0.5 to 5 hours and more preferably about 0.5 to 1 hours.

Second Embodiment

The method of manufacturing a microcapsule according to the second embodiment of the present invention includes: forming a capsule wall with a third polymer component that is formed by using isocyanate in a liquid composition; and modifying the capsule wall with a fourth polymer component including polymer particles including a polymer that is formed without using isocyanate by adding the polymer particles to the liquid composition obtained in the forming of the capsule wall. In the microcapsule in the second embodiment of the invention, the capsule wall of the microcapsule is formed from the third polymer component that is formed by using isocyanate; and a surface of the capsule wall is modified with the fourth polymer component including a polymer formed without using isocyanate.

In the microcapsule according to the second embodiment of the invention, the surface of the capsule wall, which is formed from the third polymer component, is modified with the fourth polymer component. Accordingly, similarly to the microcapsule according to the first embodiment of the invention, when the kind and the amount of the third and fourth polymer components are appropriately selected, the capsule characteristics such as heat resistance, light resistance, thermal sensitivity, color development and humidity dependence can be simply and easily controlled. As a result, it becomes possible to impart desired characteristics to the microcapsule in accordance with the field in which it is used (heat-sensitive recording materials, pressure sensitive recording materials and so on). Furthermore, the microcapsule in the second embodiment of the invention can be formed by adding, in the liquid composition, polymer particles (the fourth polymer component) including a polymer that is formed without using isocyanate to the microcapsules having a microcapsule wall made of the third polymer component that is formed by using isocyanate. Accordingly, when the fourth polymer component is formed separately from the third polymer component and then added, the fourth polymer component can be simply and easily adhered to the capsule wall surface (i.e., the fourth polymer component can modify the capsule wall surface). As a result, the microcapsule in the second embodiment of the invention can be easily manufactured by partly using a conventional method of manufacturing a microcapsule.

Here, "a surface of the capsule wall is modified with the fourth polymer component" means, similarly to the above, a state where the fourth polymer component adheres to a surface of a capsule wall including the third polymer component. The fourth polymer component is not necessarily adhered to the entire surface of the capsule wall. However, the fourth polymer component is preferably adhered to substantially an entire surface of the capsule wall in a range that does not damage the characteristics (for instance, transparency and so on) intrinsic to the microcapsule; and more preferably the fourth polymer component covers the entire surface of the capsule wall.

In a similar manner as in the first embodiment of the invention, the liquid composition includes a compound that forms the third polymer component, which becomes a capsule wall. Further, materials such as a dye precursor, an organic solvent, an auxiliary solvent, a surfactant and the like that are to be encapsulated may be dissolved and included in the liquid composition. These materials to be encapsulated may also be dispersed in water and included in the liquid composition.

In the microcapsule according to the second embodiment of the invention, the ratio of an adhered area (covering area) of the fourth polymer component to a surface area of the capsule wall, in view of sufficiently exhibiting effects of the invention, is preferably 70% or more, and more preferably 80% or more.

Furthermore, an adhered amount of the fourth polymer component to the microcapsule in the second embodiment of the invention may be appropriately selected according to objects for which the invention is used; however, in view of sufficiently exhibiting effects of the invention, the adhered amount is preferably in the range of 1 to 50% by mass, and more preferably in the range of 5 to 30% by mass based on a mass of the microcapsule.

The microcapsule according to the second embodiment of the invention, without particular limitation, can be appropriately used in fields where the microcapsule can be used. For instance, the microcapsule can be preferably used as a microcapsule containing a color forming component and so on in heat-sensitive recording materials and pressure-sensitive recording materials. Furthermore, the application of the microcapsule according to the second embodiment of the invention is, similarly to the microcapsule according to the first embodiment, not limited to the heat-sensitive recording materials and the pressure-sensitive recording materials, and the microcapsule may be used as lubricants and the like.

Method of Manufacturing Microcapsule

A manufacturing method of a microcapsule according to the second embodiment of the invention includes forming a capsule wall with a third polymer component that is formed by using isocyanate in a liquid composition; and modifying a surface of the capsule wall with a fourth polymer component including polymer particles including a polymer that is formed without using isocyanate by adding the polymer particles to the liquid composition obtained in the forming of the capsule wall. According to the manufacturing method of microcapsule according to the second embodiment of the invention (hereinafter, sometimes simply referred to as "manufacturing method according to the second embodiment"), the microcapsule according to the second embodiment can be simply and easily manufactured. Here, "modifying a surface of the capsule wall with a fourth polymer component" means, similarly to the above, to modify a surface of the capsule wall with the fourth polymer component including polymer particles; and "modifying" means to adhere the fourth polymer component on a surface of the capsule wall including the third polymer component.

Forming Capsule Wall

The capsule wall formation step is a step of forming a capsule wall with a third polymer component in a liquid composition. The capsule wall in the second embodiment of the invention can be formed in the same manner as in the capsule wall formation in the first embodiment, except for the use of the third polymer component.

The third polymer component that becomes a material of the capsule wall is formed by using isocyanate. Preferable examples of the third polymer component include polyurethane and polyurea. The third polymer component may be used in combination of two kinds or more.

According to the interfacial polymerization method, the microcapsule according to the second embodiment of the invention is formed by pouring an oil phase that is prepared by dissolving or dispersing a core substance in a hydrophobic organic solvent into a aqueous phase followed by emulsifying and dispersing and further followed by heating. As the aqueous phase in which the oil phase is emulsified and dispersed, an aqueous solution in which a water-soluble polymer is dissolved may be used. Examples of the water-soluble polymer contained in the aqueous phase include, similarly to the first embodiment, gelatin, polyvinyl pyrrolidone and polyvinyl alcohol.

In the case of the third polymer component that becomes a capsule wall material in the invention using for instance polyurethane as the capsule wall material, polyvalent isocyanate and a second substance (for instance, polyol and polyamine) that reacts with polyvalent isocyanate to form a capsule wall are mixed in an aqueous solution of a water-soluble polymer (aqueous phase) or an oily medium (oil phase) to be encapsulated, followed by emulsifying and dispersing in water, further followed by heating, thereby a polymer formation reaction occurs at an oil drop interface, whereby a capsule wall can be formed.

Similarly to the above, as the polyvalent isocyanate and partner polyol and polyamine that react therewith, ones described in U.S. Pat. Nos. 3,281,383, 3,773,695 and 3,793,268, JP-B Nos. 48-40347 and 49-24159 and JP-A Nos. 48-80191 and 48-84086 can be used.

Modification

In the modification step of the second embodiment of the invention, in a capsule wall-formed (microcapsulated) liquid composition, polymer particles including a polymer that is formed without using isocyanate are added and the capsule wall is modified with the fourth polymer component including the polymer particles.

The fourth polymer component is formed from polymer particles including a polymer that is formed without using isocyanate. In other words, the fourth polymer component is formed from a polymer different from the third polymer component. From a viewpoint of the control of the capsule characteristics, polymers different in the hydrophilicity or the hydrophobicity and the glass transition temperature can be more preferably used.

Furthermore, the difference between the glass transition temperatures of two kinds of polymers is preferably 5° C. or more, and more preferably 10° C. or more.

Still furthermore, the polymer particles are preferably insoluble or poorly soluble to water. Specifically, the solubility of the polymer particles to 100 ml of water is preferably 0.1 mol/l or less.

In the invention, the fourth polymer component is preferably formed from a monomer having an ethylenic unsaturated bond (the above-described monomer of the invention).

Furthermore, examples of the fourth polymer component include polymers that are formed by polymerizing the same monomers as the monomers that form the above-described second polymer component. The fourth polymer component may be formed from a single monomer or may be a copolymer of two kinds or more thereof.

A particle diameter of the polymer particles that form the fourth polymer component is not particularly limited as far as it is smaller than a particle diameter of a microcapsule formed in the forming of the capsule wall. It is preferably one half of the particle diameter of the microcapsule or less, and more preferably one twentieth of the particle diameter of the microcapsule or less. A particle diameter of the polymer particles is preferably 100 nm or more in a median average particle diameter. Furthermore, a weight average molecular weight of the polymer particles that form the fourth polymer component, from a viewpoint of the material isolating properties, is preferably about 10,000 to 300,000, and more preferably about 10,000 to 100,000. Still furthermore, a number average degree of polymerization of the polymer particles that form the fourth polymer component, from the viewpoint of the material isolating properties, is preferably about 10 to 200, and more preferably about 20 to 100.

In a manufacturing method according to the second embodiment of the invention, when the polymer particles are added to a liquid composition where the capsule wall was formed (microcapsulated), the fourth polymer component can be adhered to the capsule wall (the fourth polymer component can modify the capsule wall). The polymer particles can be synthesized according to known polymerization methods; among these, it can be preferably synthesized according to the radical polymerization.

A reaction temperature in the modification in the second embodiment of the invention is not particularly limited as far as it is in a temperature range that does not adversely affect a composition of the fourth polymer component that becomes emulsion. Specifically, the reaction temperature, though varying depending on the kind of the fourth polymer component and the kind of the capsule wall material (the third polymer component), is normally preferably about 40 to 100° C., and more preferably about 50 to 80° C. Furthermore, similarly, a reaction time is neither particularly limited as long as the polymer particles (the fourth polymer component) are uniformly dispersed and adhered to the surface of the capsule wall (the polymer particles modify the surface of the capsule wall). Specifically, though it differs depending on the kind of the fourth polymer component, it is preferably about 1 to 24 hours and more preferably about 2 to 5 hours.

Furthermore, an amount of the polymer particles to be added, from a viewpoint of fully exhibiting the effect of the invention, is preferably 1 to 200% by mass and more preferably 30 to 100% by mass based on a mass of the microcapsule.

In the modification step in the second embodiment of the invention, the polymer particles being added to the liquid composition may be added in the form of emulsion, a dispersion solution or a suspension solution as it is immediately after the polymerization reaction due to the monomer polymerization and so on. Furthermore, after the polymer particles are purified by means of filtration and so on, solid powder thereof may be added. In the second embodiment of the invention, it is particularly preferable to add the polymer particles in the form of emulsion.

As to the timing when the polymer particles are added to the liquid composition in the modification step in the second embodiment of the invention, there is no particular limitation as far as it is set at the timing after the formation of the capsule wall in the capsule wall formation step. For instance, after the formation of the capsule wall (after emulsion polymerization), the polymer particles may be successively added. Furthermore, the fourth polymer component (polymer particles) may be either one of a single kind and two or more kinds, and this can be appropriately determined in accordance with desired characteristics. Still furthermore, as needs arise, the fourth polymer component layer may be formed in multi-layers on the capsule wall by adding plural times the polymer particles.

In the step of modification in the second embodiment of the invention, in stirring the liquid composition, a known stirrer such as a homogenizer can be used.

In the invention, in order to improve the adhering efficiency of the polymer particles (fourth polymer component), a surfactant and so on can be used.

Examples of the surfactants that can be used in the step of modification in the second embodiment of the invention include those having, as a hydrophilic functional group, anionic groups such as a sulfate group, a nitrate group, a phosphate group, a borate group and a carboxyl group, or polyoxyalkylene chain structures such as polyoxyethylene, polyoxymethylene and polyoxypropylene and a hydroxy group, and as a hydrophobic group, an alkyl group and a phenyl group. These may be used singly or in combination of two or more kinds.

A content of the surfactant is preferably in the range of 1 to 30 parts by mass and more preferably in the range of 1 to 20 parts by mass based on one part by mass of the polymer particles.

Surface Smoothing

In the invention, it is preferable, after the modification step, to apply a smoothing treatment on a surface of the capsule wall that has been modified by the fourth polymer component so as to further improve the modification effect by increasing the coverage of the capsule wall with the fourth polymer component. Examples of the smoothing treatment include applying a heat treatment to the microcapsules, a plasticizer treatment, and so on. In particular, the heat treatment may be preferably applied. When the heat treatment is applied after the step of modification, the coverage of the capsule wall with the fourth polymer component can be improved and a covering state with the fourth polymer component can be improved.

Examples of the plasticizer that can be used in the plasticizer treatment include ester compounds such as phthalic ester compounds, aliphatic ester compounds and phosphoric ester compounds. The plasticizer is preferably in a liquid state at normal temperature. Furthermore, there are no particular limitations on the temperature and time period of the plasticizer treatment as far as they are within a range in which the capsule dispersion can withstand. An amount of the plasticizer to be added is preferably 50% by mass or less and more preferably 20% by mass or less based on the fourth polymer component. As a lower limit of the amount to be added, 2% by mass or more is preferable.

Specifically, in the plasticizer treatment, after the polymer particles are added to the capsule dispersion, the above-described plasticizer is added to the capsule dispersion followed by being stirred. An amount of the plasticizer to be added is preferably 100% by mass or less based on the polymer particles. When the plasticizer is added to the capsule dispersion solution, in the capsule dispersion, the polymer particles (polymer component) adsorbed on the capsule wall absorb highly hydrophobic plasticizer and swell, resulting in softening. Accordingly, only by stirring the capsule dispersion solution, the shape of the polymer particles adsorbed on the capsule wall is deformed due to collision between individual particles and the like. As a result, the unevenness on the surface of the polymer component that covers the microcapsule can be reduced, that is, the surface of the microcapsule can be smoothed.

In the heat treatment, a temperature of the heat treatment can be set with reference to the glass transition temperature or the like of the fourth polymer component. For instance, a temperature of the heat treatment is preferably higher than the glass transition temperature of the fourth polymer component, more preferably higher by 10 to 40° C., and still more preferably higher by 20 to 30° C. In the second embodiment of the invention, from a viewpoint of improving an adhered state of the fourth polymer component (polymer particles), a temperature of the heat treatment is preferably room temperature or more and more preferably 60° C. or more.

A treatment time period of the heat treatment, though not particularly limited, is normally preferably about 0.5 to 5 hours and more preferably 0.5 to 1 hours.

The microcapsules of the first and second embodiments of the invention may be utilized in recording materials such as heat-sensitive recording materials and the like. Examples of the heat-sensitive recording materials that may be produced by using the microcapsules of the present invention include those described in JP-A Nos. 8-337727, 2002-19304, 2003-72241, 2003-112479 and 2004-74728.

EXAMPLES

The present invention will be explained with reference to examples below. However, the examples should not be construed to limit the scope of the invention. In examples below, "%" represents "% by mass" and "parts" represents "parts by mass".

Example 1

Preparation of Solution of Microcapsule Containing Electron-donating Colorless Dye In 16.9 g of ethyl acetate, 8.9 g of a yellow-developing electron-donating colorless dye (1) described below was dissolved, followed by adding 20 g of a capsule wall material (trade name: Takenate D-110N, manufactured by Takeda Chemical Industries, Ltd.) and 2 g of a capsule wall material (trade name: Millionate MR200, manufactured by Nippon Polyurethane Industry Co., Ltd.).

An obtained solution was added to a mixed solution of 42 g of 8% phthalated gelatin and 1.4 g of polymerizable surfactant (trade name: 10% Eleminol RS-30, manufactured by Sanyo Chemical Industries, Ltd.), followed by emulsifying and dispersing at 20° C., whereby an emulsion was obtained. In the next place, to an obtained emulsion, 14 g of water and 72 g of a 2.9% tetraethylenepentamine aqueous solution were added, followed by heating to 60° C. under stirring, and after two hours elapsed there, a microcapsule solution (I) that had the electron-donating colorless dye (1) below as a core and an average particle diameter of 0.5 μm was obtained.

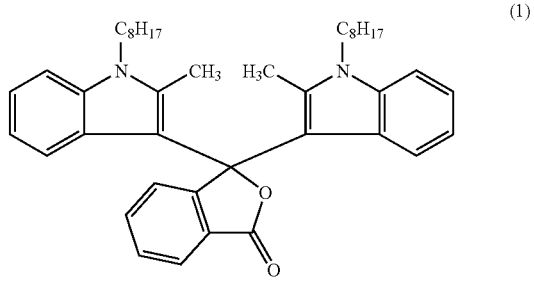

Electron-donating colorless dye

Into a three-necked flask provided with a stirring blade, a monomer inlet, a nitrogen inlet and a curer, 20 g of the above-obtained microcapsule solution (I), 5.8 g of a polymerizable surfactant (trade name: 10% Eleminol RS-30, manufactured by Sanyo Chemical Industries, Ltd.), 3.0 g of a water-soluble thermal polymerization initiator (trade name: V-050, manufactured by Wako Pure Chemical Industries, Ltd.) and 9 g of 8% phthalated gelatin were added, and 3 g of styrene monomer (manufactured by Tokyo Kasei Kogyo Co., Ltd.) was further added as a monomer of the invention under a nitrogen purge, followed by stirring for 15 min. Thereafter, the mixture was heated to 60° C. followed by reacting under stirring for 30 min, further followed by further adding 1.8 g of a water-soluble thermal polymerization initiator (trade name: V-050, manufactured by Wako Pure Chemical Industries, Ltd.), left to react for 6 hours, and thereby a microcapsule covered with polystyrene having an average particle diameter of 0.37 μm was obtained. The glass transition temperature of polystyrene was about 100° C.

When a covering state of an obtained microcapsule covered with polystyrene was observed with a scanning electron microscope (SEM) and a transmission electron microscope (TEM), it was confirmed that a surface of the microcapsule wall was covered with polystyrene.

Furthermore, polystyrene was confirmed by use of TOF-SIMS and, by means of dynamic mechanical thermal analysis (DMTA), other than the microcapsule-derived Tg, the Tg of polystyrene was also measured. Accordingly, it was confirmed that other than the microcapsule wall (the first polymer component), polystyrene that is the second polymer component was present.

Example 2

Example 2 was conducted in the same manner as in example 1, except that, instead of styrene monomer, the same amount of bisphenol 1,4-dimethacrylate (BPA-DiMAc) was used. As a result, a microcapsule covered with polybisphenol 1,4-dimethacrylate ester having an average particle diameter of 0.42 μm was obtained. In the same procedure as in example 1, it was confirmed that the microcapsule was covered with polybisphenol 1,4-dimethacrylate. The glass transition temperature of polybisphenol 1,4-dimethacrylate was about 50° C., and a covering state was better than that of the microcapsule according to example 1.

Example 3

Example 3 was conducted in the same manner as in example 1, except that, instead of styrene monomer, the same amount of benzyl methacrylate (BzMAc) was used. As a result, a microcapsule covered with polybenzyl methacrylate having an average particle diameter of 0.45 μm was obtained. In the same procedure as in example 1, it was confirmed that the microcapsule was covered with polybenzyl methacrylate. The glass transition temperature of polybenzyl methacrylate was about 54° C., and a covering state was better than that of the microcapsule according to example 1.

Example 4

Example 4 was conducted in the same manner as in example 1, except for further adding 3 g of benzyl methacrylate (BzMAc) after adding styrene monomer (St). As a result, a microcapsule covered with polystyrene/polybenzyl methacrylate having an average particle diameter of 0.5 μm was obtained. In the same procedure as in example 1, it was confirmed that the microcapsule was covered with polystyrene/polybenzyl methacrylate. The glass transition temperature of polystyrene/polybenzyl methacrylate was about 60° C., and a covering state was better than that of the microcapsule according to example 1.

Example 5

Example 5 was conducted in the same manner as in example 1, except that, instead of styrene monomer, the same amount of methyl acrylate (MA) was used. As a result, a microcapsule covered with polymethyl acrylate having an average particle diameter of 0.38 μm was obtained. In the same procedure as in example 1, it was confirmed that the microcapsule was covered with polymethyl acrylate (PMA). The glass transition temperature of polymethyl acrylate was about 10° C., and a covering state was better than that of the microcapsule according to example 1.

Example 6

Example 6 was conducted in the same manner as in example 1, except that, instead of styrene monomer, the same amount of ethyl methacrylate (EtMA) was used. As a result, a microcapsule covered with polyethyl methacrylate having an average particle diameter of 0.56 μm was obtained. In the same procedure as in example 1, it was confirmed that the microcapsule was covered with polyethyl methacrylate (PEtMA). The glass transition temperature of polyethyl methacrylate was about 65° C., and a covering state was better than that of the microcapsule according to example 1.

Example 7

Example 7 was conducted in the same manner as in example 1, except that, instead of styrene monomer, the same amount of butyl methacrylate (BuMA) was used. As a result, a microcapsule covered with polybutyl methacrylate having an average particle diameter of 0.62 μm was obtained. In the same procedure as in example 1, it was confirmed that the microcapsule was covered with polybutyl methacrylate (PEtMA). The glass transition temperature of polybutyl methacrylate was about 20° C., and a covering state was better than that of the microcapsule according to example 1.

Example 8

Example 8 was conducted in the same manner as in example 1, except that, instead of styrene monomer, 0.5 g of butyl methacrylate and 0.5 g of methyl methacrylate were used together. As a result, a microcapsule covered with polybutyl methacrylate/polymethyl methacrylate having an average particle diameter of 0.45 μm was obtained. In the same procedure as in example 1, it was confirmed that the microcapsule was covered with polybutyl methacrylate/polymethyl methacrylate. The glass transition temperature of polybutyl methacrylate/polymethyl methacrylate was about 10° C., and a covering state was better than that of the microcapsule according to example 1.

Example 9

Preparation of Solution of Microcapsule Containing Electron-donating Colorless Dye In 16.9 g of ethyl acetate, 8.9 g of a yellow-developing electron-donating colorless dye (1) described above was dissolved, followed by adding 20 g of a capsule wall material (trade name: Takenate D-110N, manufactured by Takeda Chemical Industries, Ltd.) and 2 g of a capsule wall material (trade name: Millionate MR200, manufactured by Nippon Polyurethane Industry Co., Ltd.).

An obtained solution was added to a mixed solution of 42 g of 8% phthalated gelatin and 1.4 g of polymerizable surfactant (trade name: 10% Eleminol RS-30, manufactured by Sanyo Chemical Industries, Ltd.), followed by emulsifying and dispersing at 20° C., whereby an emulsion solution was obtained. In the next place, to an obtained emulsion solution, 14 g of water and 72 g of a 2.9% tetraethylenepentamine aqueous solution were added, followed by heating to 60° C. under stirring, and after two hours elapsed there, a microcapsule solution (II) that had the above electron-donating colorless dye (1) as a core and an average particle diameter of 0.5 μm was obtained.

Into a three-necked flask provided with a stirring blade, a monomer inlet, a nitrogen inlet and a curer, 20 g of the above-obtained microcapsule solution (II), 5.8 g of a polymerizable surfactant (trade name: 10% Eleminol RS-30 manufactured, by Sanyo Chemical Industries, Ltd.), 3.0 g of a water-soluble thermal polymerization initiator (trade name: V-050, manufactured by Wako Pure Chemical Industries, Ltd.) and 9 g of 8% phthalated gelatin were added, and 3 g of styrene monomer (manufactured by Tokyo Kasei Kogyo Co., Ltd.) was further added as a monomer of the invention, followed by, under a nitrogen purge, stirring for 15 min. Thereafter, the mixture was heated to 60° C. followed by reacting under stirring for 30 min, further followed by further adding 1.8 g of a water-soluble thermal polymerization initiator (trade name: V-050 manufactured by Wako Pure Chemical Industries, Ltd.), left to react for 6 hours, and thereby a microcapsule covered with polystyrene having an average particle diameter of 0.37 pm was obtained. The glass transition temperature of polystyrene was about 100° C.

In the next place, the microcapsule solution (II) was agitated at 100° C. for 0.5 hours to apply heat treatment, whereby a microcapsule in the invention was obtained.

When a covering state of an obtained microcapsule covered with polystyrene was observed with a scanning electron microscope (SEM) and a transmission electron microscope (TEM), it was confirmed that a surface of the microcapsule wall was covered with polystyrene. Furthermore, when a covering state before the heat treatment and that after the heat treatment were compared, it was confirmed that in the microcapsule after the heat treatment, a covered-polystyrene was melted and a covering state was excellent.

Furthermore, polystyrene was confirmed by use of TOF-SIMS and, by means of dynamic mechanical thermal analysis (DMTA), other than the microcapsule-derived Tg, the Tg of polystyrene was also measured. Accordingly, other than the microcapsule wall (the first polymer component), polystyrene that is the second polymer component was confirmed to be present.

Example 10

Example 10 was conducted in the same manner as in example 9, except that, instead of styrene monomer, the same amount of benzyl methacrylate (BzMAc) was used. As a result, a microcapsule covered with polybenzyl methacrylate having an average particle diameter of 0.42 μm was obtained. In the same procedure as in example 9, it was confirmed that the microcapsule was covered with polybenzyl methacrylate and a covering state was excellent. The glass transition temperature of polybenzyl methacrylate was about 54° C., and the heat treatment was applied at 60° C. for 0.5 hours.

Example 11

Example 11 was conducted in the same manner as in example 9, except that, instead of styrene monomer, the same amount of methyl methacrylate (MMA) was used. As a result, a microcapsule covered with polymethyl methacrylate having an average particle diameter of 0.51 μm was obtained. In the same procedure as in example 9, it was confirmed that the microcapsule was covered with polymethyl methacrylate and a covering state was excellent. The glass transition temperature of polymethyl methacrylate was about 105° C., and the heat treatment was applied at 100° C. for 1 hours.

Example 12

Preparation of Solution of Microcapsule Containing Electron-donating Colorless Dye In 16.2 g of ethyl acetate, 6.8 g of an electron-donating colorless dye (2) described below was dissolved, followed by adding 14.2 g of a capsule wall material (trade name: Takenate D-110N, manufactured by Takeda Chemical Industries, Ltd.) and 5.4 g of diisopropyl naphthalene (trade name: KMC-113, manufactured by Kureha Chemical Industry Co., Ltd.).

An obtained solution was added into a mixed solution of 52.7 g of PVA (trade name: PVA-217C, 8% aqueous solution, manufactured by Kuraray Co., Ltd.), 0.39 g of sodium dodecylbenzene sulfonate (manufactured by Tokyo Kasei Kogyo Co., Ltd.) and 8.5 g of water, followed by emulsifying and dispersing at 20° C., and thereby an emulsion solution was obtained. In the next place, at room temperature, to an obtained emulsion solution, a mixture of 61 g of water and 0.13 g of a 2.9% tetraethylenepentamine aqueous solution was added, followed by heating to 65° C. under stirring, after the elapse of 3 hours, a microcapsule solution (III) that had an electron-donating colorless dye (2) described below as a core and an average particle diameter of 0.4 μm was obtained.

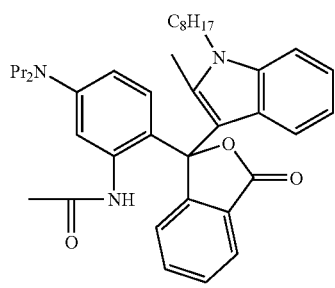

(2)

Electron-donating colorless dye

Furthermore, separately, into a three-necked flask provided with a stirring blade, a monomer inlet, a nitrogen inlet and a curer, 80 g of water was poured followed by dissolving 4 g of sodium dodecylsulfonate (manufactured by Tokyo Kasei Kogyo Co., Ltd.) and 104 mg of potassium persulfate (manufactured by Wako Pure Chemical Industries, Ltd.). The dissolved solution was heated to 70° C. in an oil bath, after heating, 20 g of methyl methacrylate (manufactured by Tokyo Kasei Kogyo Co., Ltd.) was dropped at a speed of 180 μL/min. After the dropping came to completion, by stirring for two hours, a suspension solution A of polymer particles was obtained. By means of gas chromatography (trade name: GC, manufactured by Shimadzu Corporation), it was confirmed that there was no residual monomer, and when a particle diameter of polymethylmethacrylate particles was measured according to a particle diameter measurement device (trade name: LB-500, manufactured by Horiba, Ltd.), it was 0.018 μm.

In the next place, in an Erlenmeyer flask, after 5 g of the microcapsule solution (III) obtained from the above was diluted with 18 g of water, 0.39 g of the above suspension solution of polymer particles A was dropped, followed by stirring for 4 hours at room temperature, and thereby a microcapsule solution containing microcapsules covered with polymethylmethacrylate was obtained. The glass transition temperature of the polymethylmethacrylate particles was 105° C.

When an obtained microcapsule covered with polymethylmethacrylate was observed of a covering state thereof with a scanning electron microscope (SEM) and a transmission electron microscope (TEM), it was confirmed that a surface of the microcapsule wall was covered with polymethylmethacrylate particles.

Example 13

Example 13 was conducted in the same manner as in example 12, except that, instead of methyl methacrylate, the same amount of benzyl methacrylate was used. As a result, a microcapsule covered with polybenzyl methacrylate particles having an average particle diameter of 0.026 μm was obtained. In the same procedure as in example 12, it was confirmed that the microcapsule was covered with polybenzyl methacrylate particles. The glass transition temperature of polybenzyl methacrylate particles was 54° C.

Thereafter, a covered capsule was heat treated at 80° C. for 2 hours. When the surface of the microcapsule before the heating was compared to the surface of the microcapsule after the heating, it was confirmed that the covered polybenzyl methacrylate was melted and a covering state was excellent in the microcapsule that had undergone the heat treatment.

Example 14

Example 14 was conducted in the same manner as in example 12, except that, instead of methyl methacrylate, the same amount of styrene was used. As a result, a microcapsule covered with polystyrene particles having an average particle diameter of 0.028 μm was obtained. In the same procedure as in example 12, it was confirmed that the microcapsule was covered with polystyrene particles. The glass transition temperature of polystyrene particles was 100° C.

Example 15

Example 15 was conducted in the same manner as in example 12, except that, instead of potassium persulfate, the same amount of 2,2' azobis(2-amidinopropane) dihydrochloride (trade name: V-50 manufactured, by Wako Pure Chemical Industries Ltd.) was used. As a result, a microcapsule covered with polymethylmethacrylate particles having an average particle diameter of 0.020 μm was obtained. In the same procedure as in example 12, it was confirmed that the microcapsule was covered with polymethylmethacrylate particles.

Example 16

Example 16 was conducted in the same manner as in example 12, except that, instead of potassium persulfate, the same amount of 2,2' azobis(2-methyl-N-[1,1-bis(hydroxymethyl)-2-hydroxyethyl]propionamide) (trade name: VA-80, manufactured by Wako Pure Chemical Industries Ltd.) was used. As a result, a microcapsule covered with polymethylmethacrylate particles having an average particle diameter of 0.068 μm was obtained. In the same procedure as in example 12, it was confirmed that the microcapsule was covered with polymethylmethacrylate particles.

Example 17

Example 17 was conducted in the same manner as in example 12, except that, instead of methyl methacrylate, the same amount of butyl methacrylate was used. As a result, a microcapsule covered with polybutylmethacrylate particles having an average particle diameter of 0.042 μm was obtained. In the same procedure as in example 12, it was confirmed that the microcapsule was covered with polybutylmethacrylate particles. The glass transition temperature of the polybutylmethacrylate particles was 20° C.

Example 18

Preparation of Solution B of Microcapsule Containing Diazonium Salt

As a capsule wall material, 7.7 g of a mixture of 4.5 g of xylene diisocyanate/trimethylol propane adduct (trade name: Takenate D-110N (75% ethyl acetate solution), manufactured by Mitsui Takeda Chemicals inc.) and 4.5 g of 30% ethyl acetate solution of a xylylene diisocyanate/bisphenol A adduct synthesized according to a method described in JP-A No. 7-88356 was uniformly agitated. Separately, 77 g of an aqueous solution of 8% phthalated gelatin to which 4.5 g of a surfactant (trade name: ScraphAG-8, manufactured by Nippon Fine Chemical Co., Ltd.) was added was prepared. A diazonium salt compound below was added therein, followed by emulsifying and dispersing. To an obtained emulsion solution, 20 g of water was added followed by homogenizing, thereafter under stirring at 40° C., an encapsulating reaction was carried out for 3 hours. Thereafter, a liquid temperature was lowered to 35° C., 4.1 g of ion-exchange resin (trade name: Amberlite IRA68, manufactured by Organo Corporation) and 8.2 g of ion-exchange resin (trade name: Amberlite IRC50, manufactured by Organo Corporation) were added, followed by stirring for further 1 hour. Thereafter, the ion-exchange resins were filtered to be removed, a concentration was adjusted so that a solid content concentration in a capsule solution should be 20.0%, and thereby a solution of microcapsules containing a diazonium salt compound was obtained. A particle diameter of the obtained microcapsule was measured with a particle diameter measurement unit (trade name: LA-700, manufactured by Horiba, Ltd.) and found to be 0.5 μm in median diameter.

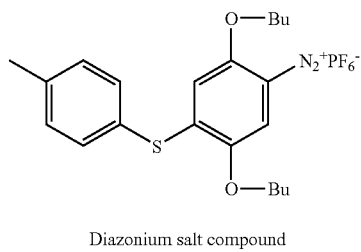

Diazonium salt compound

In an Erlenmeyer flask, 5 g of the above-obtained solution of microcapsules containing a diazonium salt compound was diluted with 18 g of water, 0.39 g of the above suspension solution A of polymer particles in example 12 was dropped, followed by stirring for 4 hours at room temperature, and thereby a microcapsule solution containing microcapsules covered with polymethylmethacrylate was obtained.

When an obtained microcapsule covered with polymethylmethacrylate was observed of a covering state thereof with a scanning electron microscope (SEM) and a transmission electron microscope (TEM), it was confirmed that a surface of the microcapsule wall was covered with polymethylmethacrylate particles.

Example 19

Preparation of Heat-sensitive Recording Material

Preparation of Metal Salicylate Dispersion Solution

To 3.75 parts of the above-obtained phthalated gelatin solution, 10.02 parts of ion-exchange water, 5.0 parts of metal salicylate (electron-attracting compound) described below and 1.25 parts of an aqueous solution of 2% sodium 2-ethylhexyl succinate were mixed followed by dispersing by means of a ball mill for 1 night, and thereby a dispersion solution of metal salicylate was obtained. An average particle diameter of metal salicylate that is in dispersion in the dispersion solution was measured with LA-910 (manufactured by Horiba, Ltd.) and found to be 0.5 μm, and a concentration of solid content was 26.3%.

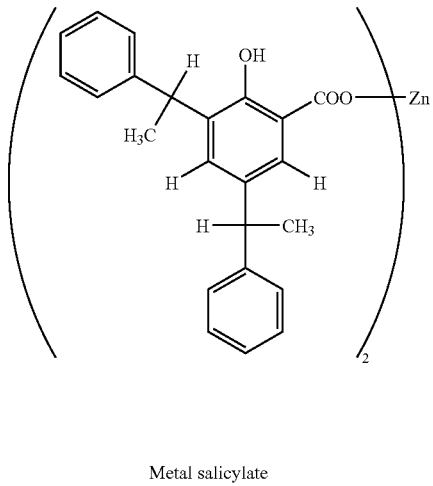

Metal salicylate

Preparation of Coating Solution A for Heat-sensitive Recording Layer

The solution of microcapsules containing an electron-donating colorless dye in example 12 and the dispersion solution of metal salicylate were mixed so that a ratio (by mass) of electron-donating dye precursor/metal salicylate should be 1/20, and thereby a coating solution A for heat-sensitive recording layer was obtained.

Preparation of Coating Liquid A for Protective Layer 160 parts of vinyl alcohol/alkyl vinyl ether copolymer (trade name: EP-130, manufactured by Denki Kagaku Kogyo Kabushiki Kaisha), 8.74 parts of a mixture of sodium alkyl sulfonate and phosphate ester of polyoxyethylene alkyl ether (trade name: Neoscore CM-57 (54% aqueous solution), manufactured by Toho Chemical Industry Co., Ltd.) and 3832 parts of ion-exchange water were mixed, followed by dissolving at 90° C. for 1 hour, and thereby a homogeneous coating liquid A for protective layer was obtained.

Preparation of Heat-sensitive Recording Material

A polyethylene terephthalate (PET) support having a thickness of 75 μm was prepared as a support; on the PET support, by use of a Mayer bar, the above-obtained coating liquid A for heat-sensitive recording layer was coated so that a coating amount of the electron-donating dye precursor should be 0.361 g/cm$^2$, followed by drying, and thereby a heat-sensitive recording layer was formed. Subsequently, on the heat-sensitive recording layer, the above-obtained coating liquid A for protective layer was coated so that a coating amount of solid content should be 1.39 g/cm$^2$, followed by drying, and thereby a heat-sensitive recording material (I) according to example 19 was obtained.

Example 20

A heat-sensitive recording material B was prepared in the same manner as in example 19, except that the microcapsule solution which contains microcapsules covered with polymethylmethacrylate particles was changed to the microcapsule solution of example 14 which contains microcapsules covered with polystyrene particles.

Comparative Example 1

A heat-sensitive recording material C was prepared in the same manner as in example 19, except that the electron-donating colorless dye-containing microcapsule solution was changed to the microcapsule solution (III) of example 12.

Evaluation 20 steps of energy were applied to form an image to the heat-sensitive recording materials prepared in examples 19 and 20 and comparative example 1, under the conditions of a pulse width of 1 ms and the resolution of 150 dpi (R=2471 Ω, V=23.9 V). An optical density (OD) of an image formed on the heat-sensitive recording layer at each of the steps was measured with a reflection densitometer (trade name: X-rite 310TR, manufactured by X-Rite Corp.). The values of optical density of the respective heat-sensitive recording materials at a foot portion (step 7 (56.3 mJ/mm$^2$) and step 8 (64.5 mJ/mm$^2$)) (i.e., sensitivity at a foot portion) were compared, and results thereof are shown in Table 1 below. Here, the "sensitivity at a foot portion" indicates sensitivity in the beginning of increase of optical density. The result of low sensitivity at a foot portion means that a curve of optical density increase is sharp and steep. The lower the sensitivity at a foot portion is, the more preferable.

TABLE 1

| | Optical Density (OD) | |
|---|---|---|
| | Step 7 (ratio with respect to comparative example 1) | Step 8 (ratio with respect to comparative example 1) |
| Example 19 | 0.09 (70.3%) | 0.138 (66.4%) |
| Example 20 | 0.085 (61.3%) | 0.135 (60.0%) |
| Comparative example 1 | 0.128 | 0.225 |

As shown in Table 1, comparing examples 19 and 20 with comparative example 1, the heat-sensitive recording materials according to examples 19 and 20 that use the microcapsules according to the present invention are lower in sensitivity at a foot portion. Accordingly, since the color development in a low temperature region can be suppressed and a gradient of the developed sensitivity becomes larger, a clear image less in the color turbidity could be obtained. Thus, according to the invention, by covering (modifying) the microcapsules with a desired polymer component, the formed microcapsules can be provided with desired characteristics such as low sensitivity at a foot portion.

What is claimed is:

1. A method of manufacturing a microcapsule, comprising:
   forming a capsule wall with a first polymer component in a liquid composition; and
   modifying a surface of the capsule wall with a second polymer component by adding a monomer having an ethylenic unsaturated bond to the liquid composition obtained in the forming of the capsule wall, to thereby polymerize the monomer.

2. The method of claim 1, wherein, in the modifying of the surface of the capsule wall, a surfactant and a polymerization initiator are further added to the liquid composition to polymerize the monomer.

3. The method of claim 2, wherein the surfactant includes a polymerizable group.

4. The method of claim 1, further comprising, in the modifying of the surface of the capsule wall, applying a surface smoothing treatment to the surface of a capsule wall modified with the second polymer component.

5. The method of claim 4, wherein the surface smoothing treatment includes applying heat treatment to the capsule wall modified by the second polymer component.

6. The method of claim 5, wherein the heat treatment is applied at a temperature equal to or greater than a glass transition temperature of the second polymer component.

7. The method of claim 5, wherein the heat treatment is applied at a temperature of 80° C. or more.

8. The method of claim 1, wherein the second polymer component has a glass transition temperature of 80° C. or less.

9. A method of manufacturing a microcapsule, comprising:
   forming a capsule wall with a third polymer component that is formed by using isocyanate in a liquid composition; and
   modifying a surface of the capsule wall with a fourth polymer component comprising polymer particles including a polymer that is formed without using isocyanate, by adding the polymer particles to the liquid composition obtained in the forming of the capsule wall.

10. The method of claim 9, further comprising, in the modifying of the surface of the capsule wall, applying a surface smoothing treatment to the surface of the capsule wall modified with the fourth polymer component.

11. The method of claim 10, wherein the surface smoothing treatment includes applying a heat treatment to the capsule wall that is modified with the fourth polymer component.

12. The method of claim 11, wherein the heat treatment is applied at a temperature equal to or greater than a glass transition temperature of the fourth polymer component.

13. The method of claim 9, wherein the polymer particles are formed from a monomer having an ethylenic unsaturated bond.

* * * * *